Dec. 18, 1962     P. H. HOFER     3,068,516
EXTRUDED CONTOUR COATING
Filed June 1, 1960     3 Sheets-Sheet 1

INVENTOR.
PETER H. HOFER
BY
Walter C. Kehm
ATTORNEY

Dec. 18, 1962 P. H. HOFER 3,068,516
EXTRUDED CONTOUR COATING
Filed June 1, 1960 3 Sheets-Sheet 2

INVENTOR.
PETER H. HOFER
BY
*Walter C. Kohn*
ATTORNEY

INVENTOR.
PETER H. HOFER
BY
Walter C. Kehm
ATTORNEY

United States Patent Office 3,068,516
Patented Dec. 18, 1962

3,068,516
EXTRUDED CONTOUR COATING
Peter H. Hofer, Berkeley Heights, N.J., assignor to Union
Carbide Corporation, a corporation of New York
Filed June 1, 1960, Ser. No. 33,199
17 Claims. (Cl. 18—13)

This invention relates to surface coating of extruded contours. More particularly, the invention relates to method and apparatus for forming uniform ultra-thin coatings on biaxially stretched thermoplastic films as an integral step in the production of such films.

The use of surface coatings to alter the characteristics of flexible packaging is well known. By means of a functionally specific coating flexible packaging material such as paper, cellophane and thermoplastic films have been adapted to a great variety of end-uses. Users of cellulosic packaging, i.e., paper and cellophane, are accustomed to packaging materials "tailor-made" to meet their marketing needs. The advent of thermoplastic film, particularly stretched, biaxially oriented films, brought to the art packaging materials of theretofore unattained strength and toughness. The packaging industry, however, still demanded the specific end-use properties which were available in cellulosic packaging material. In particular, anti-fog properties are needed for meat and produce packaging films, anti-static properties are needed to avoid dust accumulation on window envelopes and the like, and water vapor and gas barrier coatings are needed to protect other goods.

To answer this need coatings have been developed for thermoplastic films. The initial methods for applying such coatings were naturally borrowed from the cellulosic coating art. The coating procedures involved use of solvent or emulsion systems in a separate step from thermoplastic film formation. The cost of such procedures is prohibitive for all but premium priced, highly specialized films because of (1) the initially high cost of the thermoplastic base sheet (compared to cellulosic materials), (2) the labor and equipment expense involved in a second film handling operation and (3) the capital expenditure for application, drying and solvent recovery equipment. Additionally the solvents necessary for certain coating materials e.g., liquid hydrocarbons, have a tendency to soften the resin base, which precludes use of these solvents.

Extra cost factors (2) and (3) could be substantially eliminated by performing the coating operation as an integral part of the biaxially stretched thermoplastic film forming operation. Such a course would take advantage of the methods of thermoplastic film manufacture presently used and would avoid difficulties encountered in trying to adapt an old coating method to a new packaging material.

It is an object, therefore, of the present invention to provide method and apparatus for surface coating extruded film as an integral step in the film forming operation.

It is another object to provide method for producing functionally specialized biaxially stretched thermoplastic films by application of a coating imparting the desired properties as an integral step in the extrusion-stretching operation.

It is another object to provide method and apparatus for extruding, biaxially stretching and surface coating seamless tubing in a continuous manner.

These and other objects are accomplished with the method of the present invention by applying a thickness of adherent coating material to essentially unstretched extruded thermoplastic tubing as the tubing emerges from the forming die, simultaneously positively regulating the thickness of the adhering coating and the uniformity of distribution thereof about the periphery of the extruded contour while the tubing remains in an essentially unstretched state and thereafter stretching the tubing in the machine and transverse direction, simultaneously uniformly thinning the adhering coating.

Apparatus is also provided comprising a primary die for extruding seamless thermoplastic tubing, a secondary die substantially coaxial with the primary die and adapted to peripherally bear against the tubing with a force sufficient to relieve the greater part of the longitudinal stress from the tubing therebelow and maintain said tubing in an essentially unstretched state, means for applying adherent coating material on the essentially unstretched tubing as it passes from the primary die to the secondary die and means for drawing the tubing through the secondary die.

It is an essential feature of the present invention to apply adherent coating material onto the extruded tubing while the tubing is essentially unstretched and subsequently only to stretch the tubing. Because of this feature more uniform ultra-thin coatings are achieved by my invention than are obtained by pre-stretching and coating or simultaneously stretching and coating thermoplastic films.

The invention will be more fully described hereinbelow in conjunction with the attached drawings wherein.

Figure 7A:
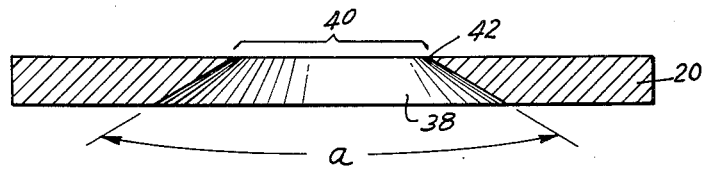
Figure 7B:
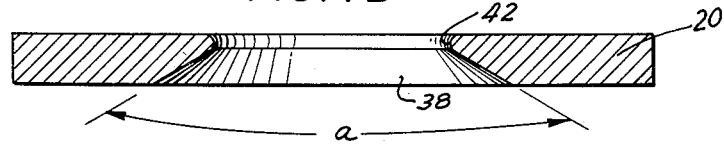
Figure 7C:
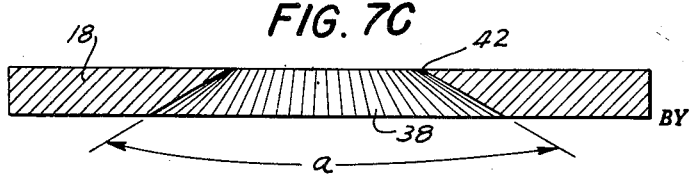

FIGS. 7–A, 7–B and 7–C are sectional views of modifications of the secondary die in lip shape and surface.

Figure 1:
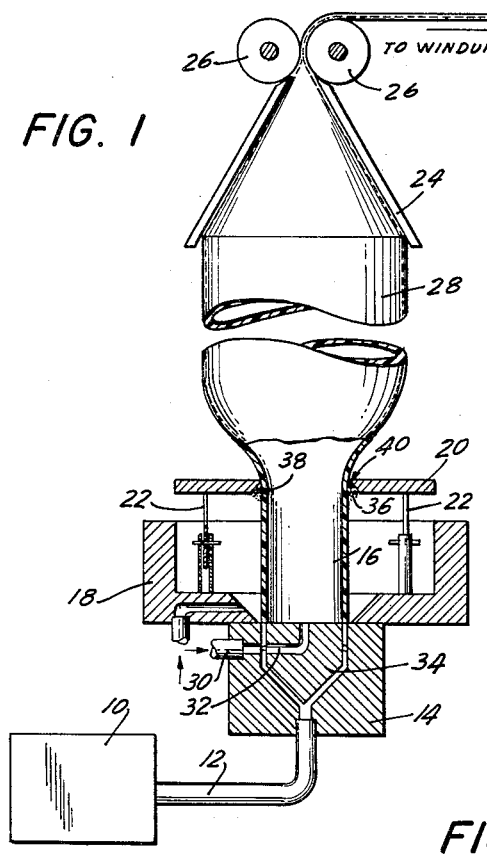
FIG. 1 is a partly diagrammatic sectional view of the tube extruding unit of one embodiment of the invention.

Referring now to the drawings where like reference numerals indicate like parts there is shown in FIG. 1 an apparatus for coating and biaxially stretching extruded thermoplastic film in a continuous manner comprising an extruder 10, a 90° elbow bend 12 through which molten thermoplastic resin is fed to a primary die 14 which forms the molten thermoplastic into seamless tubing 16. Means for cooling the tubing 16 as it emerges from the primary die 14 comprising, for example, an air ring 18 is provided. Spaced above and coaxial with the primary die 14 is a secondary die 20 adjustably mounted on supports 22 which die is adapted to peripherally bear against tubing 16. A standard collapsing frame 24 and nip rolls 26 which withdraw the tubing from the dies therebelow are provided to collapse the tubing which is then fed to a wind-up apparatus (not shown). A bubble generally indicated at 28 is formed in the tubing 16 above the secondary die 20 by maintaining in the tubing a fluid medium introduced through inlet 30 in primary die 14 and passageway 32 in die pin 34.

Highly uniform coatings are applied to the extruded tubing 16 in accordance with the present invention with approximately doughnut shaped annular rolling bank 36 of the desired coating material mounted in the space defined by the wall 38 of secondary die orifice 40 and the adjacent portion of tubing 16. Formation of annular bank 36 is accomplished by applying coating material to the essentially unstretched portion of the tubing 16 located below the secondary die 20, conveying the applied coating material on the tubing 16 to the secondary die 20, drawing the tubing 16 through the secondary die orifice 40 while maintaining a controllable scraping contact between the tubing 16 and the edge portion of the wall 38 of the secondary die orifice 40, thereby scraping ("doctoring") from the tubing 16, as it passes the edge 42 of the secondary die orifice 40, all coating material in excess of that desired on the tubing 16. The doctored coating material is forced along the wall 38 of the secondary die orifice 40 away from the tubing 16. The coating material coheres in a mass and as it again contacts the tubing 16 is carried along with the tubing toward the secondary die orifice 40 where it is again scraped off the tubing between edge portion of wall 38 and the scraping, cohering, recontacting cycle is repeated. This cycle causes the mass of coating material to form around the tubing 16 an annular bank 36 having a clockwise rotation. It is easily seen that the constant freshening of the portion of the bank 36 actually in contact with tubing 16 eliminates problems of insufficient coating material supply at any point on the periphery of tubing 16. The rolling annular bank 36 ensures an even distribution of coating material at all points on the tubing as it passes through the secondary die orifice 40.

The edge 42 of secondary die 20 maintains a peripheral contact with the tubing 16. As pointed out above, at a minimum this contact is sufficient to relieve the greater portion of the longitudinal stress exerted on the tubing 16 by the nip rolls 26 or other withdrawal means, preferably 90 percent and more of the stretching force exerted by the nip rolls 26 is relieved by the secondary die 20. The die 20 by thus relieving the stretching stress maintains the tubing 16 in an essentially unstretched state at the time the coating material is applied thereto by the rolling bank 36.

By the term "essentially unstretched" as applied to thermoplastic tubing in the present specification and claims is meant that state of the tubing wherein only a minor amount, i.e., less than 50 percent and preferably less than 10 percent stretch is imparted to the tubing. Thus, the amount of stretch allowed in the tubing before it passes the secondary die is not more than 50 percent over its original length and preferably less than 10 percent of its original length. The controlling of the amount of stretch imparted to the tubing during the coating operation, i.e., coating only essentially unstretched tubing as above described is a critical feature of my invention which provides more uniform thickness in the coating finally achieved.

After the coating material has been uniformly applied by the annular rolling bank 36 to the tubing 16 and after it passes the secondary die 20 the tubing 16 is inflated to form bubble 28 by being drawn over a quantity of fluid medium such as air, nitrogen, argon or the like trapped between nip rolls 26 and the primary die 14. Inflation of the tubing causes lateral (transverse direction) stretching of the tubing 16.

The secondary die 20 is positioned in such a manner that the stationary bubble 28 develops and is maintained entirely above said die with no expansion in the tubing 16 occurring below the secondary die 20. Thus, there is no significant lateral stretching of the tubing 16 below the secondary die 20 and said portion of the tubing remains essentially unstretched in either the transverse or machine direction. The distance from the primary die 14 to the secondary die 20 can be varied within rather wide limits, the controlling factor being the need to maintain the portion of the tubing below the secondary die 20 in an essentially unstretched state. Distances from 1–36 inches have been found entirely suitable.

Figure 6:
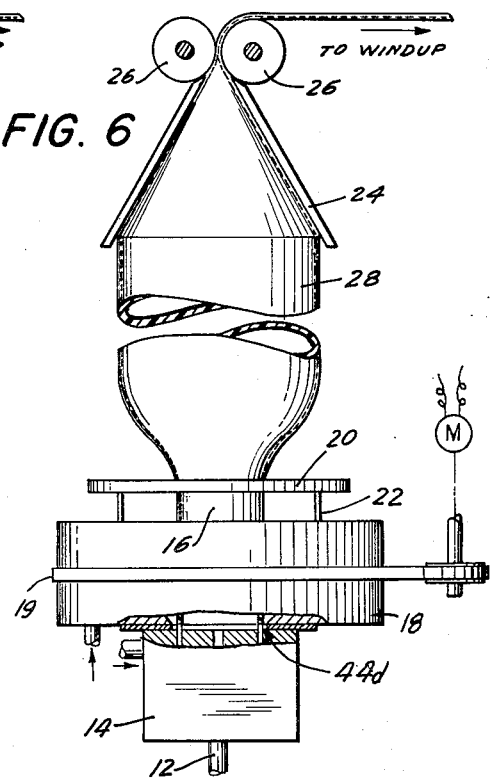
FIG. 6 is an elevational view partly broken away to show underlying parts of the tube extrusion and coating apparatus illustrating application of coating material directly from the die face onto the extruded tube.

The tubing 16 is stretched in both the transverse and machine directions by being inflated at a point above the secondary die 20, lateral stretching being imparted by the trapped fluid medium and longitudinal stretching by the pulling force of the nip rolls 26. The tubing 16 is cooled as it traverses the distance from primary die 14 to secondary die 20 either by the ambient atmosphere or preferably by a blast of cool air from the air ring 18 directed at all points on the periphery of the tubing 16. In a preferred embodiment of the apparatus the air ring 18 is rotatably mounted above the primary die 14 and is revolved slowly about the tubing 16 by a rotating means such as driven belt 19 as said tube is drawn therepast as shown in FIGURE 6. Where air ring 18 rotates it is convenient to similarly rotate the secondary die 20 at approximately the same speed, e.g., 1/3 to 2 revolutions per minute, as by maintaining the said die on said air ring as shown in FIG. 1. In this embodiment more uniform cooling of the tubing 16 is obtained and also the annular rolling bank 36 of coating material is given another motion which further insures uniform distribution of the coating material on the tubing 16 prior to inflation.

The cooled tubing 16 above the secondary die 20 is stretched in two directions and is thereby biaxially oriented, provided the tubing is at the orientation temperature of the particular film. Generally speaking, these orientation temperatures are the temperatures at which the constituent molecules of a film are permanently aligned by stretching. Biaxial orientation of thermoplastic films by means of the blown tubing method is well known to the art and need not be further described here except to mention that provision of a secondary die 20 spaced above the primary die and providing a distance for the tubing to traverse makes possible a greater amount of molecular orientation in the film bubble than can be achieved by blowing a bubble in tubular film immediately upon emergence from the extrusion die orifice.

As the tubing 16 is inflated the coating material on the film surface is drawn thinly over the expanded surface area. This drawing occurs uniformly and evenly leaving a substantially constant thickness of coating material over the entire film surface with no bare, uncoated spots.

Resins which can be continuously extruded, coated and biaxially stretched by the method of the present invention are the extrusion grades of thermoplastic resins capable of forming self-supporting films. Among the more commercially important resins which can be used in my invention are extrusion grades of polyethylene, phenoxy, vinyl resins and polystyrene. As is indicated by the diversity of these illustrative resins in properties and extrusion qualities, the method herein disclosed is widely applicable and is useful with all thermoplastic resins which are extrudable into tubular film.

Any coating material which adheres to a hot resin substrate can be applied by the method and apparatus of the present invention. Particularly desirable coating materials are those imparting specific functional improvements to the thermoplastic film, for example, anti-static, anti-fog or water vapor and gas barrier properties. It is sometimes preferable to coat with solventless systems and the present method is admirably suited thereto. For example, melt coating is readily carried out by heating the coating material in the absence of a solvent to the melting temperature of the coating material and holding the melt material in contact with the essentially unstretched tubing as it passes from the primary to the secondary die. The suitability of coating from a hot melt is a noteworthy advantage of the present invention. Heretofore attempts at hot melt coating have involved the use of a bath through which pre-formed film was passed. The result was usually a heat shrunk or partly decomposed film with a rather uneven coating. The second heating step is not required in my method and therefore the advantages of biaxial orientation are retained and uniform coatings are also achieved. Coating materials which can be applied from a melt are thermally stable while liquid and have melting temperatures at about or below the temperature of the extrudate to be coated. Means for applying the coating material are numerous and range from a hand held spatula to positive pressure systems. The use of a receptacle to catch material falling from the annular rolling bank either off the secondary die or down the tube itself in order to maintain an easily replenishable supply of resin below the rolling bank is preferred.

Figure 2:
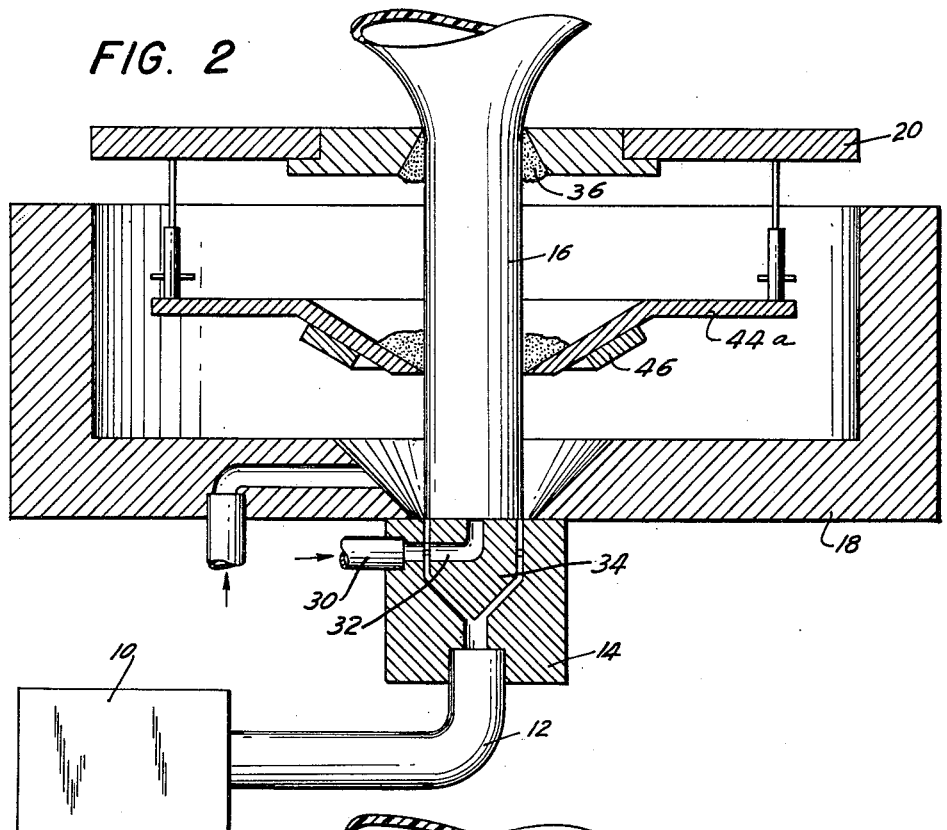
FIG. 2 is a partly diagrammatic sectional view of one embodiment of the tube coating apparatus.

One type of receptacle particularly adapted to solid powdered coating materials is shown in FIG. 2 wherein receptacle 44A, which is adjustably mounted below secondary die 20 which is in turn supported above the primary die 14 by means not shown, is provided with electric heating element 46 to maintain the powdered coating material therein at an elevated temperature such that contact of powdered coating material with the hot extruded tubing 16 causes immediate fusing of the coating material on the tubing. A portion of the adhering coating material is doctored from the tubing 16 as it passes the secondary die 20 and while still molten forms a rolling annular bank 36. Excess coating material solidifies and falls back into the receptacle 44A whence it is again contacted with the hot tubing 16. If desired, the receptacle 44A can be modified to provide a porous bottom through which are or other gas can be blown at a rate sufficient to form a fluidized bed of the contained powdered coating material.

Figure 3:
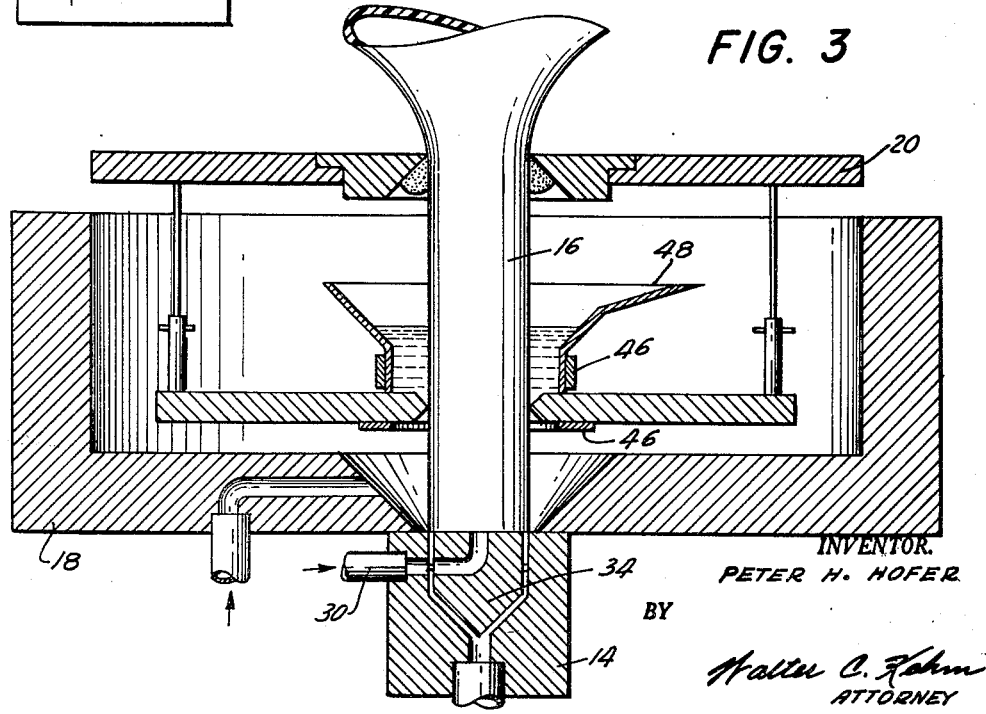
FIG. 3 is a sectional view partly in elevation of another embodiment of the tube coating apparatus.

In FIG. 3 another receptacle 44B is shown which permits containment of liquid coating materials, either hot melts or solutions of coating materials in solvents which do not substantially adversely affect the thermoplastic films, e.g., alcohol solvents with polystyrene tubing and liquid hydrocarbons with polyethylene tubing et cetera. Heat is provided on the sides and bottom of the container by heating elements 46. The receptacle 44B exceeds in diameter the secondary die orifice 40 in order that excess material from the rolling bank 36 which drips from the outermost edge of the secondary die orifice 40 will fall back into the container for reuse. A lip 48 is provided on the receptacle 44B shown in FIG. 3 to facilitate replenishing the supply of coating material from time to time.

Figure 4:
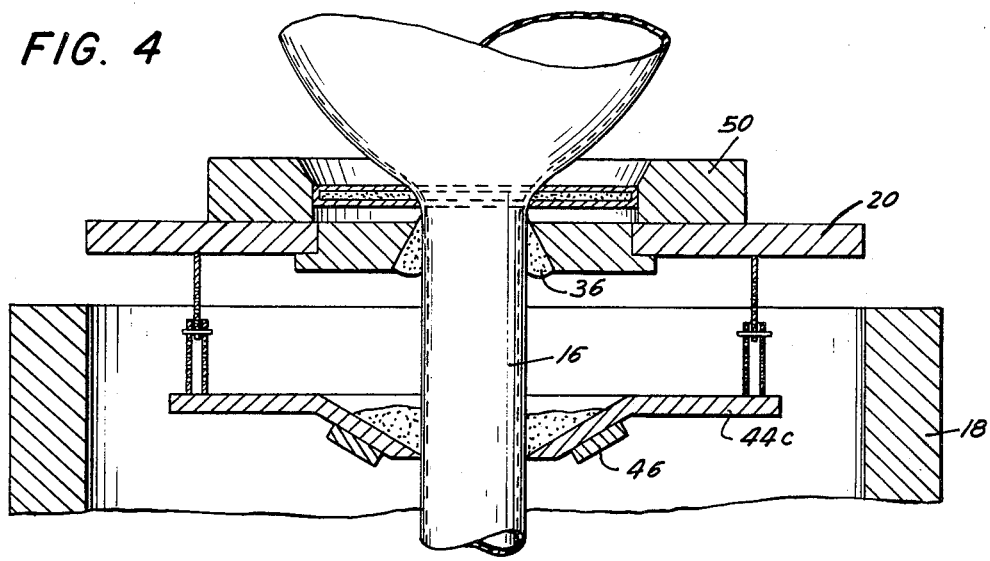
FIG. 4 is a sectional view partly in elevation of another embodiment of the tube coating apparatus illustrating means for application of a coating material under positive pressure.

In FIG. 4 there is shown an embodiment of the apparatus especially adapted to pre-wetting and coating thermoplastic tubing. As shown, the tubing 16 passes through receptacle 44C in which is disposed a pre-wetting compound which facilitates adhesion of coating materials. The pre-wetting compound adheres to the tubing 16. A diluent for the coating material can also be employed as a pre-wetting compound and thereby be applied simultaneously with the coating material. Any excess is doctored and, like coating materials, forms a rolling annular bank 36 and, after the tubing 16 has passed through the secondary die 40 but prior to stretching either longitudinally or laterally, the tubing 16 is sprayed with a liquid coating material from outlets circumferentially spaced in applicator ring 50 by air pressure. Other conventional mechanical and fluid pressure means can be used.

Figure 5:
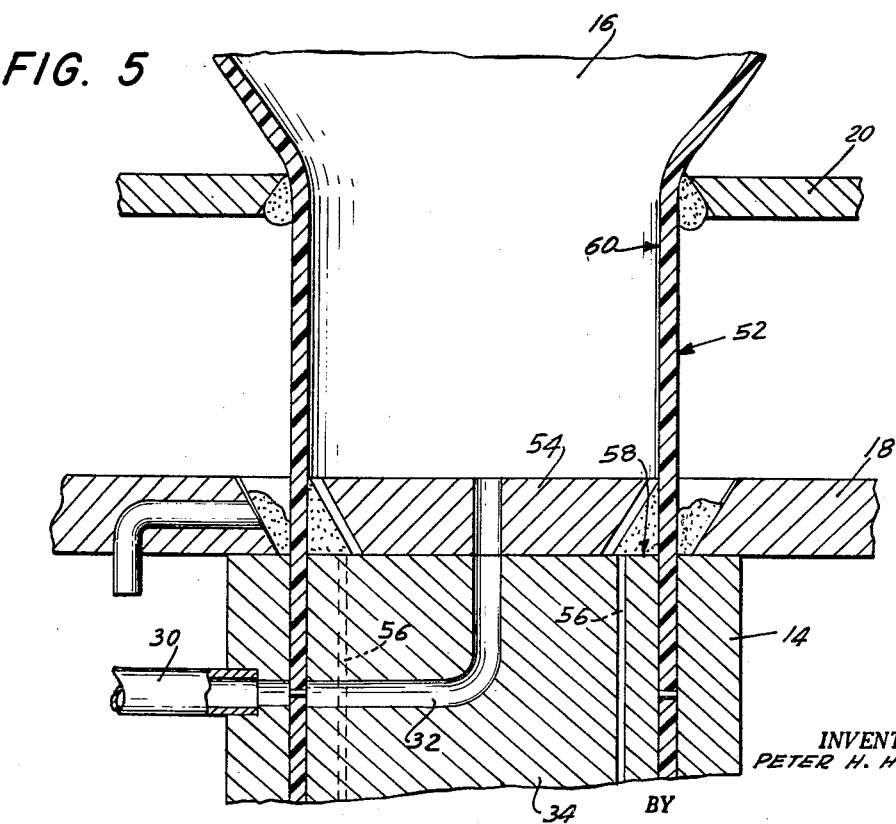
FIG. 5 is a sectional view of the tube coating apparatus illustrating simultaneous coating of inner and outer tube surfaces.

Either inner or outer surface coating of extruded tubing or both can be accomplished with the present invention. For example, in FIG. 5 there is shown an embodiment of the apparatus adapted to coat the outer surface 52 of the tubing 16 as in FIG. 1, and also provided with an inner doctor blade 54 which is coaxial with and supported by die pin 34 modified to provide channels 56 for coating material to be fed through die pin 34 onto the surface 58 thereof, to be picked up by the inner surface 60 of the tubing 16. Any excess being doctored off as the inner surface 60 of the tubing 16 passes the periphery 62 of inner doctor blade 54.

In FIG. 6 the receptacle is an annular niche 44D which is provided in the face of primary die 14 wherein wax or other coating material is disposed for contact with extruded tubing 16. In this embodiment no separate heated coating material receptacle is employed, the face of the die itself acting as the heating means. This embodiment is particularly well suited to the coating of polyethylene tubing with wax base coating materials because:

(1) Polyethylene, having a characteristically poor strength at elevated temperatures, is relatively easily torn as it passes hard, sharp surfaces and elimination of the receptacle surface bearing against the tubing reduces by one-half the contacts which can cause tearing of the film, and (2) Wax base coatings generally have low melting points, flow readily and spread uniformly and hence are ideal for coating from a comparatively small supply.

The secondary die 20 can be varied with respect to the orifice 40 therein both in shape and surface. Preferred shapes and surfaces are shown in FIGS. 7–A, 7–B and 7–C. The angle of the wall 38 of the orifice 40 can be varied in included angle "$a$" from just off the perpendicular, e.g., "$a$"=5° to "$a$"=120° with increased included angle "$a$" providing relatively thinner coatings. Coatings of from 0.0000001 to 0.0005 inch have been routinely prepared on a variety of substrates using secondary dies 40 having various included angles. The wall 38 of the orifice 40 can have a radius of curvature as shown in FIG. 7–B if it is desired for example to provide a less sharp edge in contact with the tubing 16. As shown in FIG. 7–C the wall 38 of the secondary die can be knurled to provide decorative effects or spaced coatings on the tubing as illustrated in Example 2 hereinbelow.

The secondary die orifice 40 can be equal in diameter to the orifice of the primary die 14 or may be smaller or larger. The smaller the die orifice 40 for a given size bubble 28 the greater the expansion of the tube to form the bubble and hence the greater stretching and/or orientation imparted to the tubular film. The edge 42 of the secondary die orifice 40 can be fabricated of the same or different material than the body of the secondary die 20. Suitable materials for the fabrication of the secondary die 20 and the edge 42 thereof are those which are rigid at the temperatures of the extrudates which they shape. Hence, metals such as steel and aluminum, and plastics such as phenolic resins are useful as secondary die materials.

The specific coating materials used in the examples hereinbelow are merely illustrative of suitable coating materials. Their chemical identities are:

"Versamid 940"—the condensation product of dimerized linolenic acid with a diamine sold by General Mills Inc.

Molecular weight_____ 6000–9000.
Melting point_____ 105°–115° C.
Viscosity_____ 15–30 poises @ 150° C.

"Pentalyn A"—the pentaerythritol ester of rosin, having a softening point of 109–116° C. and sold by Hercules Powder Company.

"Paraffin Wax"—sold by Esso Standard Oil Company as "Essowax 5010" and having a melting point of 149–151° F.

"Microcrystalline Wax" sold by Esso Standard Oil Company as "Microvan 1650" and having a melting point of 165° F.

"Aluminum Paste" sold by Aluminum Company of America as "Albron Aluminum Paste" (65% leafing aluminum in mineral spirits).

The following examples are illustrative of the practice of the present invention. All parts and percentages are by weight unless otherwise stated. The apparatus used in the following examples is shown in FIG. 3.

EXAMPLE 1

*Coating of Blown Tubular Polystyrene Film*

The extruder used was a Royle & Sons model No. 3 having a 4½ inch diameter barrel. Extrusion grade polystyrene resin having a molecular weight of about 60,000 was reduced to a flowing condition and fed from the extruder through a 90° elbow bend to a bottom fed die having a 5 inch diameter annular orifice. Conventional collapsing and film windup equipment was also provided. A secondary die fabricated from ½ inch thick steel plate, having a sharp knife-edged 4⅝ inch diameter orifice in the center with an included angle of 20° was positioned above the die orifice and coaxial therewith. At the start, an extruded tube was fed through the coating container, the secondary die and nip rolls to the windup rolls. Thereafter a stationary bubble was blown with nitrogen in the tubing between the secondary die and the nip rolls. Coating material having the composition—

| Material: | Parts |
|---|---|
| Versamid 940 | 52.5 |
| Pentalyn A | 42.5 |
| Paraffin wax | 5.0 |
| | 100.0 | was heated to a melt in the coating container. The coating adhered to the hot tube as it passed through the coating container. As the adhering molten coating was carried upward on the extruded tube, the material formed a rolling annular bank in the recess formed by the wall of the extruded tube and the face of the secondary die orifice. In this manner the coating material was continuously brought into uniform circumferential contact with the extruded tube. Any excess coating material adhering to the tube was doctored from the film surface as the tube passed through the secondary die orifice.

Extrusion conditions were:

| | |
|---|---|
| Die temperature | 158° C. |
| Extrudate temperature | 180° C. |
| Extrusion rate | 152 lbs./hour. |
| Air cooling | Ca. 1000 cubic feet/minute. |
| Drawspeed | 60 feet/minute. |
| Bubble diameter/tube diameter ratio | 7.5/1. |
| Bubble shape | Blunt. |
| Film gauge | 0.00094–0.0011 inch. |
| Coating thickness | 0.000005–0.000006 inch. |

A sample of the coated film and a sample of the same film, but uncoated, were tested for moisture vapor transmission (MVT) as follows: Each of a set of standard Thwing-Albert vapometer cups was filled with approximately 55 cc. of water. Two and one-half inch diameter discs of the film samples were fitted across the cup openings. The cups were then stored at room temperature (ca. 25° C.) and loss of water vapor measured.

Results:

| Sample— | MVT (grams/100 sq. in./24 hrs.) |
|---|---|
| Uncoated | 10–13 |
| Coated | 6.85 |

EXAMPLE 2

The procedure of Example 1 was repeated except:
The coating was a wax-aluminum paste having the following composition—

| Materials: | Parts |
|---|---|
| Polyethylene | 30 |
| Microcrystalline wax | 14 |
| Paraffin wax | 56 |
| Aluminum paste | 50 |

The secondary die was changed to a steel plate having a knurl-edged 4½ inch diameter orifice.
Drawspeed was 55 feet per second.
The resulting film had a wall thickness of 0.00102–0.0013 inch. The coating was a decorative pattern of spaced bright aluminum stripes. Samples of coated and uncoated film were tested for moisture vapor transmission as in Example 1.

Results:

| Sample— | MVT (grams/100 sq. in./24 hours) |
|---|---|
| Uncoated | 10–13 |
| Coated (striped) | 4.1 |

It is evident from the excellent MVT results with the coated sample that the wax portion of the coating was over the entire film surface although the aluminum paste occurred only in spaced stripes corresponding to the valleys in the knurled surface of the secondary die bearing against the blunt shaped base of the tubing.

EXAMPLE 3

The procedure of Example 2 was followed except that less nitrogen was maintained in the bubble so that the bubble assumed a narrow based "tulip" shape. A continuous, i.e., nonstriped, coating of aluminum was achieved. Samples were tested as in Example 2.

Results:

| Sample— | MVT (grams/100 sq. in./24 hours) |
|---|---|
| Uncoated | 10–13 |
| Coated (striped) | 4.1 |

The continuity in aluminum coating obtained in this example indicates that by varying the shape of the bubble from blunt (wide base) to "tulip-like" (narrow base) the pressure exerted on the base of the bubble by the secondary die can be greatly varied. In this example, the knurled edge of the secondary die orifice had no effect on the aluminum paste in contrast with the complete blocking of aluminum paste by the ridges of the knurled surfaces in Example 2.

EXAMPLE 4

The procedure of Example 1 was used except:
The secondary die was changed to ½ inch steel plate having a smooth surfaced 4½ inch diameter orifice with an included angle of 120°;
Drawspeed was 80 feet/minute;
Air at 1500 cubic feet/minute.
A polystyrene film having a thickness of 0.00065–0.00079 inch and a surface coating of 0.000003 inch was produced.
Testing for MVT gave the following results.

| Material: | MVT (grams/100 sq. in./24 hours) |
|---|---|
| Uncoated | 10–13 |
| Coated | 9.6 |

EXAMPLE 5

*Coating of Blown Tubular Phenoxy Film*

The apparatus and procedure used were similar to those used in Examples 1–4 except that the extruder had a three and one-half inch diameter barrel, and the secondary die had a six inch orifice with an included angle of 90° and was positioned approximately two inches from the die orifice. The coating material was the same as that used in Example 1.

Extrusion conditions were:

| | |
|---|---|
| Die temperature | ° F 500 |
| Extrudate temperature | ° F 475 |
| Extrusion rate | lbs./hour 44 |
| Drawspeed | feet/minute 40–50 |
| Bubble diameter/tube diameter ratio | 2–3/1 |
| Film gauge | 1.5–2.0 |
| Coating thickness | inches ~0.0001 |

Moisture vapor transmission characteristics of this biaxially oriented film of the polycarbonate homopolymer of 2,2 bis(4-hydroxyphenyl) propane were measured as in the previous examples.

Results:

| Material— | MVT (grams/100 sq. in./24 hours) |
|---|---|
| Uncoated | 13 |
| Coated | 1 |

EXAMPLE 6

*Coating of Blown Tubular Vinyl Film*

The apparatus used was a Royle and Sons No. 2 extruder having a 3¼ inch diameter barrel connected for horizontal extrusion with a tubular die having a 5 inch diameter annular orifice. The secondary die was heated aluminum plate ⅜ inch thick provided with a six inch diameter smooth surfaced orifice and spaced approximately three inches from the primary die. The resin was $TiO_2$ pigmented rigid vinyl chloride homopolymer. The coating had the composition—

| Material: | Parts |
|---|---|
| Versamid 940 | 52.5 |
| Pentalyn A | 42.5 |
| Paraffin wax | 5.0 |
| | 100 | and was applied with a spatula to the extruded tube between the primary and secondary die. The effect of the secondary die was to form a rolling annular bank of coating material uniform all about the circumference of the tube irrespective of the point of application of the coating material.

The effect of this coating material on thermoplastic film having been shown in the preceding examples, no further tests were made on this particular film, the purpose of this example being to illustrate the obtaining of uniform coatings by horizontal extrusion and hand application of coating material.

Extrusion conditions were:

| | |
|---|---|
| Die temperature | °F__ 330 |
| Extrudate temperature | °F__ 365 |
| Secondary die temperature | °F__ 240 |
| Extrusion rate | pounds/hour__ 60 |
| Bubble diameter/tube diameter ratio | 1.5/1 |
| Film gauge | [1] 0.002–0.003 |
| Coating thickness | 0.003–0.0005 |

[1] Variation normal for horizontally extruded vinyl film.

It will be noted coatings obtained by this method are somewhat less uniform in thickness than coatings applied to vertically blown tubes. Variations in thickness are inherent in horizontal extrusion coating; hence, this mode of coating is best suited to applications where a high degree of coating uniformity is not required.

EXAMPLE 7

The procedure and apparatus of Example 6 were used except that a clear rigid vinyl chloride copolymer was used and the coating had the composition—

| Material: | Parts |
|---|---|
| Polyethylene | 30 |
| Microcrystalline wax | 14 |
| Paraffin wax | 56 |

Extrusion conditions were:

| | |
|---|---|
| Die temperature | °F__ 300 |
| Extrudate temperature | °F__ 329 |
| Secondary die temperature | °F__ 225 |
| Extrusion rate | pounds/hour__ 84 |
| Bubble diameter/tube diameter ratio | 1.7/1 |
| Film gauge | 0.001–0.003 |
| Coating thickness | ~0.00005 |

The coatings obtained using the wax coating material were more uniform than those obtained with the Versamid coating material due to the former being considerably less viscous at the extrudate temperature than the latter.

EXAMPLE 8–A

*Coating of Blown Tubular Polyethylene Film*

Apparatus similar to that shown in FIG. 6 of the drawings was used. The extruder had a 2½ inch barrel, and the secondary die was an aluminum plate having a 6 inch diameter smooth surfaced orifice. A wax coating having the formulation—

| Material: | Parts |
|---|---|
| Polyethylene | 30 |
| Microcrystalline wax | 14 |
| Paraffin wax | 56 | was applied to the extruded tube while it was essentially unstretched by liquefying the wax coating on the face of the die and maintaining it in a channel about the extruded tube. The resin was polyethylene having a melt index of 2.

Extrusion conditions were:

| | |
|---|---|
| Die temperature | °F__ 270 |
| Extrudate temperature | °F__ 302 |
| Extrusion rate | pounds/hour__ 35 |
| Bubble diameter/tube diameter ratio | 2.5/1 |
| Drawspeed | feet/minute__ 30 |
| Coating thickness | 0.0001 |

The coated film was improved in optical properties, haze being lowered from 28 percent to 21 percent and in gloss, values being raised from 40 to 60 units.

EXAMPLE 8–B

The preceding procedure was followed except that the extrudate temperature was 293 °F. Moisture vapor transmission measured as in Example 1 was reduced from 17.2 to 13.6. Haze values were lowered from 27.7 to 21.3 and gloss was increased from 39.9 to 60.1.

EXAMPLE 8–C

Another polyethylene resin (density 0.96) was similarly coated by applying the wax coating to an extruded tube thereof which was at a temperature of 347 °F. Moisture vapor transmission was reduced from 12.4 to 11.7. Haze values were lowered from 14.1 to 10.4 and gloss was increased from 61.3 to 80.8.

Haze values were measured according to ASTM D–1003–52 and gloss according to ASTM D–523–537.

What is claimed is:

1. Method for coating thermoplastic film comprising extruding molten thermoplastic in the form of seamless tubing, maintaining the tubing essentially unstretched for a distance from the die, applying adhering coating material to the essentially unstretched tubing, regulating the thickness of the adhering coating and the distribution thereof about the periphery of the tubing by passing the coated tubing through a secondary die peripherally bearing against the coated surface of the tubing, and thereafter stretching the coated tubing.

2. Method for coating thermoplastic film comprising extruding molten thermoplastic in the form of seamless tubing, maintaining the tubing essentially unstretched for a distance from the die, applying adhering coating material to the essentially unstretched tubing, regulating the thickness of the adhering coating and the distribution thereof about the periphery of the tubing by passing the coated tubing through a secondary die peripherally bearing against the coated surface of the tubing, and thereafter stretching the coated tubing in the machine and transverse direction.

3. Method claimed in claim 2 wherein solid, powdered coating material is applied to the tubing and forms an annular rolling bank around the tubing.

4. Method claimed in claim 2 wherein liquid coating material is applied to the tubing and forms an annular rolling bank around the tubing.

5. Method claimed in claim 4 wherein the coating material is a melt.

6. Method claimed in claim 4 wherein the coating material is dissolved in a solvent.

7. Method claimed in claim 4 wherein the thermoplastic is polystyrene.

8. Method claimed in claim 4 wherein said annular rolling bank rotates about the tubing.

9. Method claimed in claim 8 wherein the thermoplastic is polystyrene.

10. Method claimed in claim 9 wherein a diluent for the coating material is employed as a pre-wetting compound.

11. Method claimed in claim 10 wherein the diluent is polyethylene.

12. Apparatus for applying coatings to thermoplastic film comprising a primary die for extruding seamless thermoplastic tubing, a rigid secondary die spaced above and coaxial with the primary die, means for drawing the tubing through the secondary die, said secondary die being adapted to relieve the greater part of the longitudinal stress from the portion of the extruded tubing between said primary die and said secondary die to maintain said tubing essentially unstretched, and means for applying adherent coating material to said essentially unstretched portion of said tubing.

13. Apparatus claimed in claim 12 wherein between said primary die and said secondary die there is positioned a receptacle adapted to hold coating material in contact with the extruded tubing.

14. Apparatus claimed in claim 13 wherein said receptacle is adapted to maintain a fluidized bed of powdered coating material in contact with said tubing.

15. Apparatus claimed in claim 13 wherein said receptacle is adapted to maintain a hot melt of coating material in contact with the tubing.

16. Apparatus claimed in claim 13 wherein said rigid secondary die is mounted for rotation about the tubing.

17. Apparatus claimed in claim 16 wherein said rigid secondary die is spaced from 1 to 36 inches from said primary die.

References Cited in the file of this patent

UNITED STATES PATENTS

| | | |
|---|---|---|
| 1,956,576 | Hinsky | May 1, 1934 |
| 1,957,212 | Hinsky | May 1, 1934 |
| 2,602,959 | Fenlin | July 15, 1952 |
| 2,627,088 | Alles | Feb. 3, 1953 |
| 2,779,684 | Alles | Jan. 29, 1957 |
| 2,848,747 | Dixon | Aug. 26, 1958 |
| 2,952,874 | Doyle | Sept. 20, 1960 |
| 2,955,321 | Fortner et al. | Oct. 11, 1960 |